(No Model.)

J. H. MORRIS.
VEHICLE WHEEL.

No. 501,525. Patented July 18, 1893.

Witnesses:
M. P. Smith.
G. W. Thorpe.

Inventor:
John H. Morris.
By Hyson & Hyson
Atty's.

UNITED STATES PATENT OFFICE.

JOHN H. MORRIS, OF SEWARD, NEBRASKA.

VEHICLE-WHEEL.

SPECIFICATION forming part of Letters Patent No. 501,525, dated July 18, 1893.

Application filed March 21, 1892. Serial No. 425,661. (No model.)

*To all whom it may concern:*

Be it known that I, JOHN H. MORRIS, of Seward, Seward county, Nebraska, have invented certain new and useful Improvements in Vehicle-Wheels, of which the following is a full, clear, and exact description, reference being had to the accompanying drawings, forming a part hereof.

My invention relates to wheels of buggies and various other types of vehicles, and the objects of my invention are to provide a vehicle-wheel which shall be simple, strong, durable, and inexpensive in construction, and at the same time very light in weight, and which shall be capable of remaining in proper true condition under all conditions of wear.

To the above purposes, my invention consists in certain peculiar and novel features of construction and arrangement, as hereinafter described and claimed.

In order that my invention may be fully understood I will proceed to describe it with reference to the accompanying drawings, in which—

Figure 1:
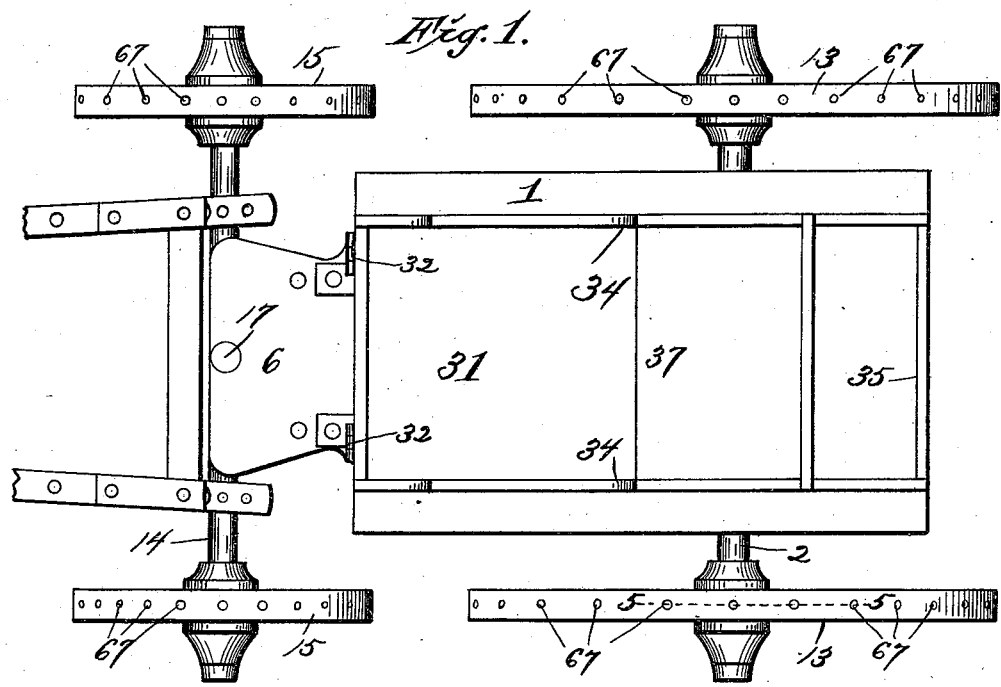
Figure 2:
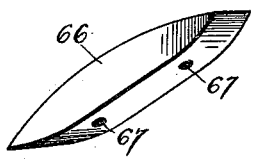
Figure 3:
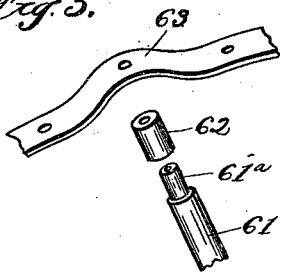
Figure 4:
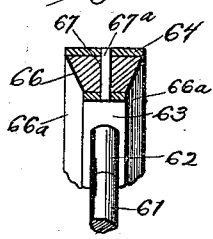
Figure 5:
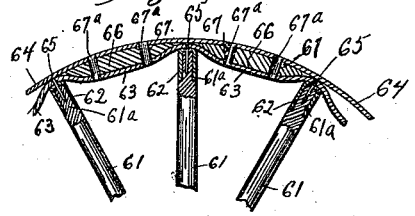

Figure 1 is a plan view of a vehicle provided with wheels embodying my invention. Fig. 2 is a detached perspective view of one of the blocks which are interposed between the inner and outer tires of the vehicle-wheels. Fig. 3 comprises detached perspective views of the outer portion of one of the spokes, a ferrule for said spoke, and a portion of the inner tire of the vehicle-wheels. Fig. 4 is a transverse vertical section of one vehicle-wheel, showing a modified form of rim. Fig. 5 is a vertical longitudinal section of a portion of one of the vehicle-wheels, on the line 5—5 of Fig. 1.

In the said drawings, 60 designates the hubs of the wheels, and said hubs are of the usual or any preferred type, as are also the spokes 61, excepting as hereinafter explained; the inner ends of said spokes being secured to the hubs in any suitable or preferred manner. The outer end of each spoke 61 is, however, reduced as shown at 61ª, and upon this reduced portion is placed a ferrule 62.

63 designates an inner tire which is in the form of a strip or band, and also preferably of steel; said strip or band being of such length as to encircle the spokes, at the outer ends thereof.

64 designates the outer tire-section of the tire proper, this tire being also in the form of a strip or band and completely encircling the outer ends of the spokes 61. These two tire-sections 63 and 64 are secured to the outer ends of the spokes by nails 65, each of which is driven through the tire-sections and into the ends of the spokes 61; the ferrules 62 preventing all possibility of splitting the ends of the spokes while so driving the nails 65.

Between the inner and outer tire-sections at points intermediate of the outer ends of each pair of spokes 60, is inserted a tension-block 66, which are preferably of wood, although any other material which possesses sufficient strength may be used, and each of said blocks is retained in its described position by rivets 67ª, or equivalent devices extending through openings 67 in the blocks. As is clearly shown in Figs. 2 and 3, each of these blocks is of elongated form, so as to fit closely between the outer ends of each pair of spokes 61, and the outer side of each block is of convex form in the segment of a circle of which the hub 60 is the center. The inner side of each block is straight from a point near one end of the block to a point near the opposite end thereof, and is thence continued outwardly at each end, in the form of a short curve which meets the extremities of the outer side of the block. Thus the inner band or rim 63 extends for the principal portion of the distance between each pair of spokes, in a straight line, and then extends obliquely outward toward the extremities of the pair of spokes. The form of the blocks 66, and their location, are such that they insure the perfect circular form of the outer tire-sections, while rendering the inner tire-sections practically straight and only slightly concave at the points between each pair of spokes; thus imparting a truss-like structure to each wheel-rim, and insuring great elasticity, strength, and lightness to the wheels, while maintaining their trueness under all conditions of wear.

In order that the location and general action of the wheels may be properly understood, I have shown them in Fig. 1 as applied to a vehicle which I will proceed to describe in a general way, but I wish it to be understood that the wheels may be applied either to a vehicle of the general type shown in Fig. 1 or to any other usual or preferred type of vehicle. In this figure, 1 designates the bottom or bed of the vehicle, 2 the rear axle of the same, 14 the front axle thereof, and 31 a seat-frame, while 37 designates the seat. The bottom 1 is shown as of oblong rectangular form, and the rear axle 2 is shown as extending transversely beneath the rear end of the bottom; the rear carrying-wheels 13 being of the construction above described, and mounted to turn upon the ends of the axle 2 in the usual or any preferred manner. 15 designates the front carrying-wheels of the vehicle, these wheels being also of the construction above described, and mounted upon the ends of the front axle in any suitable or preferred manner, so as to turn thereon. The front axle 14 is shown as extending transversely beneath the front end of a foot-board 6 which extends forward from the front end of the body 1; a king-bolt 17 serving to connect the front axle to the foot-board. The seat-frame 31 preferably corresponds in form to the body 1 of the vehicle, and is of less area than said body, and is, furthermore, hinged at its front end to the front end of the body 1, as at 32. The seat 37 rests at its ends upon side-pieces 34 of the seat-frame 37, and the rear ends of the side-pieces are shown as connected by a cross-piece 35 at the rear end of the seat-frame.

From the above description it will be seen that I have produced a vehicle the wheels of which are light, strong, and elastic, and capable of remaining true under all conditions of wear.

Having thus described my invention, what I claim as new therein, and desire to secure by Letters Patent, is—

A vehicle-wheel comprising a suitable hub, and a number of spokes radiating therefrom and having ferrules surrounding their outer extremities, an outer circular tire surrounding the outer ends of the spokes, an inner tire formed of a single piece or band and also surrounding the outer ends of the spokes, a number of nails each passing through the two tires and into the outer ends of the spokes, and a number of blocks each interposed between the outer ends of two of the spokes and also between the two tires and each of longitudinally convex form at its outer side, and having a straight inner side connected by oblique portions to the ends of the block; the inner tire being thus made straight between each pair of spokes, substantially as set forth.

In testimony whereof I affix my signature in the presence of two witnesses.

JOHN H. MORRIS.

Witnesses:
R. P. ANDERSON,
G. H. TERWILLIGER.